United States Patent
Bonnet

[15] 3,675,554
[45] July 11, 1972

[54] DEVICE FOR RECORDING AND REPRODUCING STEROSCOPIC IMAGES

[72] Inventor: Maurice Bonnet, Puteaux, France
[73] Assignee: Etablissement Public: Agence Nationale De Valorisation De La Recherche Anvar
[22] Filed: March 8, 1971
[21] Appl. No.: 121,766

[30] Foreign Application Priority Data

March 13, 1970 France..................................7009031

[52] U.S. Cl..................................95/18 P, 352/62, 353/7, 355/22
[51] Int. Cl..................................G03b 35/08
[58] Field of Search..................................95/18 P; 352/60, 61, 62; 353/7; 355/22

[56] References Cited

UNITED STATES PATENTS

| | | | |
|---|---|---|---|
| 3,267,826 | 8/1966 | Browning | 95/18 P |
| 2,562,077 | 7/1951 | Winnek | 95/18 P |
| 3,301,154 | 1/1967 | Stewart et al. | 95/18 P |

Primary Examiner—Samuel S. Matthews
Assistant Examiner—Richard L. Moses
Attorney—Baldwin, Wight & Brown

[57] ABSTRACT

The device allows one to photograph an object and to reproduce it by giving to the observer the feeling of seeing this object true-to-life and full-size. The device consists of an optical unit having at least an objective which forms, in each position taken by the unit, the image of an object being on an optical system directing the rays to a frame holding a cylindrical lenticular element film coated with a sensitive layer recording successively all composite images thus transmitted and which, during reproduction, will allow an observer to view a relief image of the object under the same conditions as a direct and actual view of this object. Such a device can be used for relief photography.

8 Claims, 8 Drawing Figures

DEVICE FOR RECORDING AND REPRODUCING STEROSCOPIC IMAGES

The present invention relates to equipment for recording relief or steroscopic images and for reproducing said images within a viewing range under conditions identical with those where they have been recorded, thus giving to objects apparent dimensions similar to those seen fullsize by the photographer.

Already known are camera devices recording on lenticular element films composite images allowing viewing images in relief. However, independently from other given defects due to optical aberrations and to the nature of the rays emitted by the light sources used for their reproduction, the images observed up to now did not give at any time the impression of seeing the recorded and projected objects true-to-life.

The equipment of the invention allows one to carry out composite shooting of films which when observed after development gives one the impression of seeing objects in full size.

The equipment of the invention consists essentially of a parallelepipedic camera having, on one of its big vertical sides, a rectangular window before which can be moved in a longitudinal direction an optical unit incorporating at least an objective which forms, for each position taken by the unit, the image of an object on an optical system directing the rays to a frame supporting a cylindrical lenticular elements film coated with a sensitive layer successively recording all composite images thus transmitted, which, during reproduction, will allow to an observer to see a relief image of the object under the same conditions as an actual direct view of this object.

When the convergent optical system which directs the rays to the sensitive surface is made of a field lens or an objective, the whole assembly made of this system and the film-holder frame is then made movable, and moves in a parallel direction to the linear moving direction of the optical unit, but moving on a path twice as long as that of this optical system.

When the convergent optical system consists of a concave mirror of rather large dimensions, the film-holder frame and the said mirror can be fixed by adding to the objective of the optical unit two appropriate prisms and by inserting between the said mirror and the output face of the second prism a semi-transparent separator plane mirror inclined at an angle of 45° to the beam axis, the said concave mirror being located perpendicular to the output axis of the prism and the sensitive surface being located in a parallel direction relative to the said axis.

In a practical embodiment of the equipment according to the invention, this equipment consists essentially of a parallelepipedic chamber having, on one of its large vertical sides, a rectangular window before which can be moved longitudinally an optical unit consisting of an objective located between two prisms and, on a horizontal face adjacent to the first face, a rectangular window of larger dimensions than the previous one and where there is inserted a frame holding a cylindrical lenticular element film coated with a sensitive layer, one of said prisms collecting the successive images of an object and reflecting them to the objective which projects them on the second prism, which again reflects them on a concave mirror located into the chamber along the wall opposite to the optical unit, by making them pass through a semi-transparent separator plane mirror inclined 45° on the beam axis and which directs the rays to the sensitive layer.

The optical unit slides along rails extending on the vertical wall under action of an electrical motor.

A dark-slide shutter, which is rolled around two cylinders spaced from both sides of the optical unit window, has a opening corresponding to the input face of the first prism and ensures the tightness of the chamber from both sides of said opening during the movement of the optical unit.

The transmission of the linear movement of the optical unit and of the dark-slide shutter through the motor is obtained by means of a cable and pulleys.

For reproducing the recorded and developed composite images, the chamber of the device, without the optical unit, is fitted on a case containing a light source whose rays pass an optical surface with cylindrical lenticular elements and a field lens of sufficient dimensions for covering the large opening of the chamber equipped with a film-holder frame for holding the cylindrical lenticular element film whose sensitive layer has been acted upon, the chamber having for this purpose been inverted 180° and the lenticular elements of said optical surface being oriented perpendicular to the lenticular elements of the film, the images being then observable through the smallest window of the chamber on the concave mirror associated with this window, and through the semi-transparent separator plane mirror, these two optical elements functioning in a manner opposite to that occuring during the shooting of a picture.

The features of the invention will become more clearly apparent during the following description by referring to the appended drawings, where:

Figure 1:
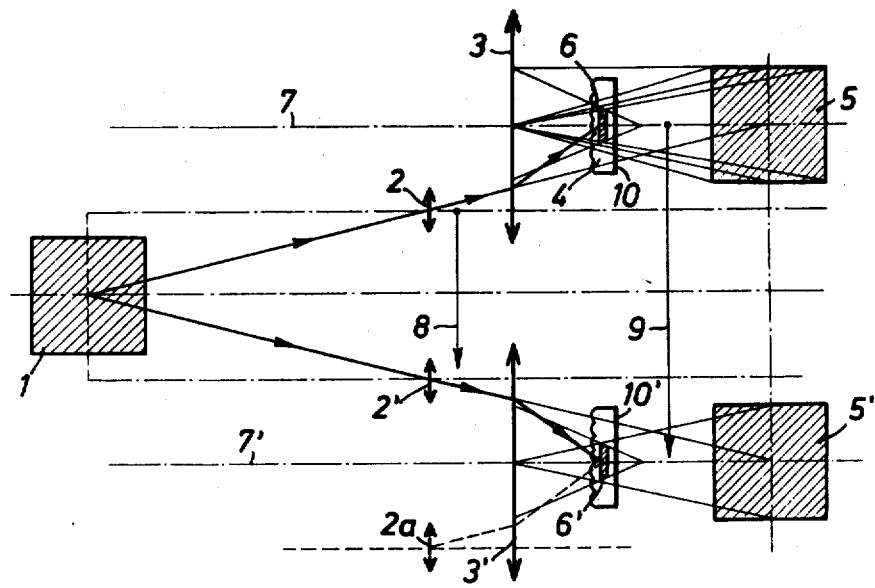
FIG. 1 is a schematic illustration of the principle of recording relief images.

The FIG. 1 is a diagram provided for a clear understanding of the recording principle of relief images of distant objects and of the direct viewing of images of the objects, while giving the feeling of the actual remoteness of said objects in full-size.

In FIG. 1, an objective 2, with the diaphragm thereof correctly adjusted, gives of an object 1, located for example at ten meters from the objective, an image 5 also located at ten meters from the output pupil of the objective 2 and consequently of same dimensions as the apparent dimension of the object.

This image arrangement can eventually allow one to obtain a full-size relief photograph of the object 1 by means of an optical surface 4 having lenticular elements located in the plane of image 5.

A convex lens 3 together with the optical surface 4 coated with a sensitive emulsion or film 10, which are located on the same axis 7 as the image intercept the beams emerging from the objective 2 in order to form an image 6 smaller than the image 5 directly obtained with objective 2, this image 6 being located in the plane of the optical surface 4 and the lenticular elements of this latter surface recording the different points of the image in form of microscopic lines or points according to the characteristics of the lenticular elements.

The image 6 is recorded by carrying out a double linear displacement of objective 2, perpendicular to the optical axis of this objective, and of the chamber (to be described hereinafter) which incorporates the convex lens 3 and the optical surface 4 bearing the sensitive emulsion 10.

This double simultaneous displacement of the objective 2 and of the chamber is indicated by the arrows 8 and 9, the path 9 of the chamber being double of the path 8 of the objective, and the speed of displacement of the chamber having also to be twice as high as the speed of the objective.

Figure 2:
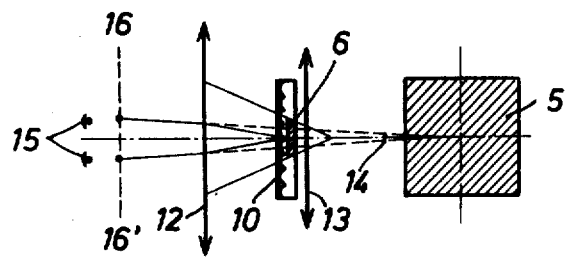
FIG. 2 is a schematic illustration of the principle of reproducing the images.

After development of the sensitive emulsion or film 10, the developed film is fitted into a device shown in FIG. 2 against an optical surface 11.

According to the invention, the device of FIG. 2 consists of a convex lens 12, identical with the lens 3 used for shooting, and, of a field lens 13 and a light source.

The eyes 15 of an observer, being at the level of the viewing range 16—16' created by the linear path of the objective, will receive the impression that the image 6 recorded in the plane of film 10, is located at ten meters from the range 16—16°.

The result obtained with this device can be carried into effect under several forms: with the preferred embodiment a convex lens 12 analog to the lens which has recorded the image, is used for observation.

It is obvious that this condition is essential in order that the very remotely recorded image look identical with the object at the moment of observation, the use of an optical means of same nature, such as a convex or concave mirror, remaining however within the scope of the invention. It will be so, for example, if the focal length or the numerical opening of the optical device, or lenticular elements, are modified when observing with respect to the corresponding shooting ones, or if viewing is carried out directly without any convergent or divergent device; in this last case, the use when recording of a concave lens or a convex mirror will lead, when observing, to increase the relief sensitivity; on the contrary, the use, when shooting, of a convex lens or of a concave mirror will decrease the feeling of relief as well as the dimensions of the image.

Figure 3:
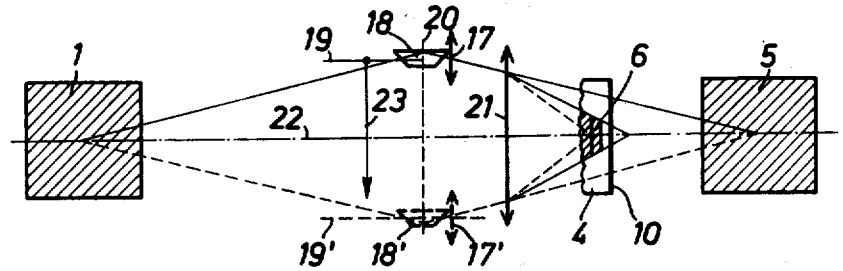
FIG. 3 is a schematic illustration of an alternative embodiment of the reproduction device.

As it has already been set forth herebefore, the device which has just been described, requires that the lens 3 and the film 10 be displaced at a speed twice as great as that of the objective 2; the FIG. 3 gives a schematic illustration of an analog device which requires only the displacement of the objective and whose overall dimensions are rather reduced.

In FIG. 3, the diaphragmmed objective 17 and a Wollaston prism 18 are integral with each other and fitted on the same optical axis 19, and their displacement in a plane 20 perpendicular to their optical axis 19 gives rise to a real spatial image 5 symmetrical with the object 1 with respect to the plane of displacement 20, in the horizontal direction.

A convex lens 21 whose optical axis 22 is parallel with the axis 19 intercepts the rays which form the spatial image 5 for focusing them into the plane of an optical surface 4 having lenticular elements by forming an image smaller than the image 5. The lenticular elements convert the different points of the image 6 into microscopic lines or points according to the characteristics of said elements the lines or points being recorded on the sensitive surface or film 10 located into the focal plane of the optical surface 4.

The viewing method will be identical with the one of the device shown in FIG. 2.

The width of the viewing range results from the path 23 of the prism 18 and of the diaphragmmed objective 17; this width is represented by the distance 17—17' in FIG. 3. In case of utilization of an optical surface with cylindrical lenticular elements, the height of the viewing range depends on that of the linear light source located in a vertical position, or of the angular field of the cylindrical lenticular elements located in the horizontal position pertaining to the optical surface used with a pin-point light source for increasing its apparent diameter in the vertical direction.

Figure 4:
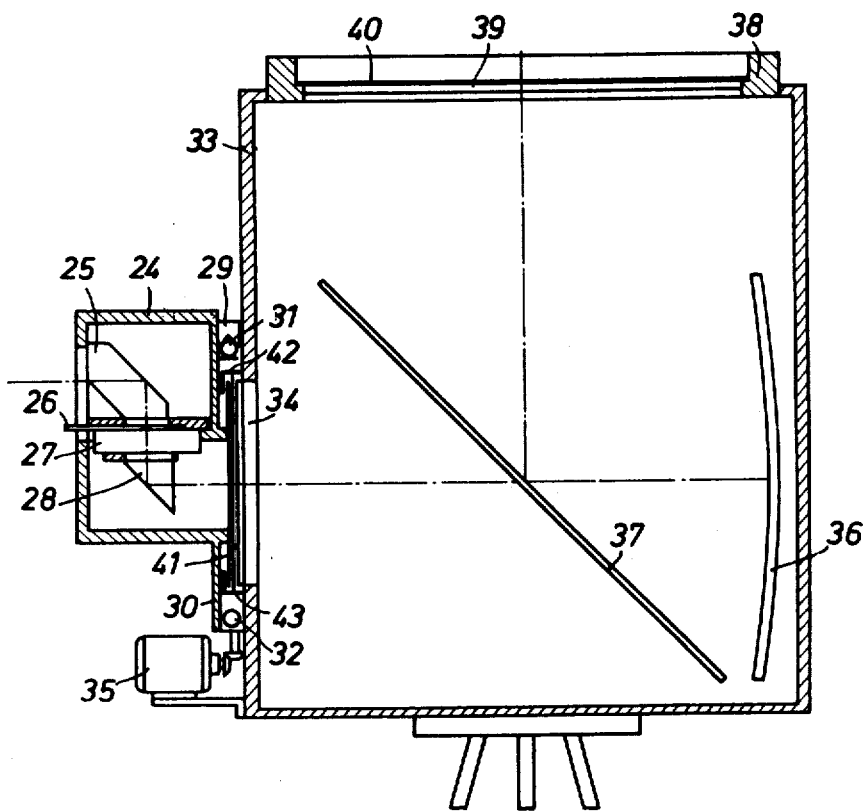
FIG. 4 is a vertical sectional view through a practical form of a camera device for infinity, taken generally along the line IV-IV of FIG. 5.

In FIG. 4 there is illustrated a practical form of embodiment of a camera device allowing one to obtain relief images of objects located at distances from the camera device graded from one meter to infinity for the same image.

This camera device offers some advantages and may be used as a test device for comparing and appreciating the performances of alternative embodiments likely to be put into effect according to the invention.

The camera device consists of an optical unit 24 which can move laterally during the shooting operation, and which thus gives rise to a real spatial image symmetrical with the object with respect to the plane of displacement in the horizontal direction. The optical unit 24 consists of the following optical means:

a right-angled prism 25 whose reflecting roof-shaped face replaces the Wollaston prism 18 of FIG. 3. The refractive index of the glass which constitutes this prism is preferably selected with a sufficiently high value for obtaining the largest field possible.

a diaphragm 26 of small dimensions (2 to 5 mm) in order to obtain a high field depth and a uniform luminosity over the whole angular value of the field of the recorded images. For this purpose the diaphragm 26 is located near the output face of the prism 25.

an objective 27, able to give from an object a good-quality image located, for example, at ten meters from its pupil, this latter being itself at a distance of ten meters from the said object.

a right-angled prism 28, with high angular field, reflects the beam which emerges in a parallel direction with the incident beam and inverts the image, which gives a complementary advantage for the right reproduction of the image, as it will be seen later.

All these optical parts are integral with each other, and constitute the box-shaped optical unit 24 which has two linear slides 29 and 30 held upon two parallel rails 31 and 32 whose extremities are integral with the chamber 33 of the device.

This chamber 33 has a lateral first window 34 allowing the luminous beam emerging from the pupil of the objective 27 to pass through. The window or opening 34 is wide enough for allowing the passage of reflected rays or beams of the total field of the considered recording base which depends on the field of the lenticular elements to be covered by the light beam when the whole optical means are moved laterally by a motor 35.

A non illustrated shutter of a well-known type is opened at the beginning of the path and closed at the end.

A concave mirror 36, having a wide angular field, is fitted in the back of the chamber so that its focus coincides approximately with the objective pupil, and that its optical axis parallel with the axis of the beam emerging from the right-angled prism 28.

A separator 37 made of a semi-transparent plane mirror reflects vertically the beam sent back by the concave mirror towards a frame 38, containing an optical surface 39 having cyclinderical lenticular elements and an interdependent sensitive surface 40. The frame 38 is seated in a second window (not numbered) in the housing chamber 33.

The distance from this surface 39 to the concave mirror 36 is so selected that the surface 39 be located in the plane containing the image given by the concave mirror 36 of the image directly supplied by both prisms 25 and 28 and the shooting objective 27, the image being initially located at ten meters from the objective 27.

Figure 5:
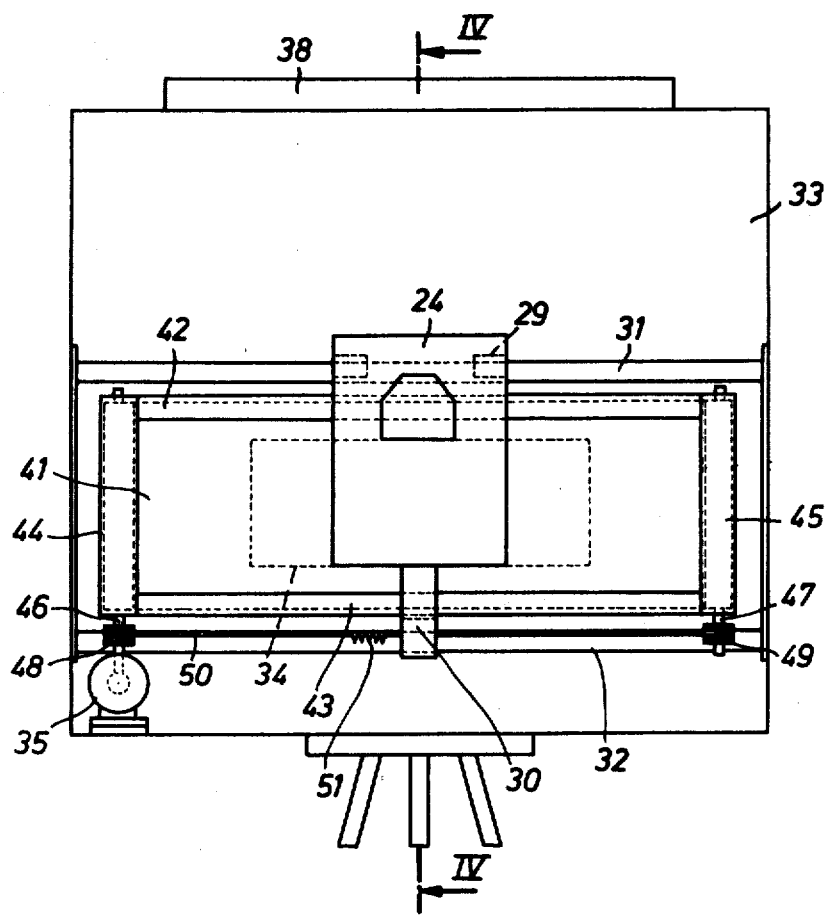
FIG. 5 is an elevational view of the camera device as viewed from the operator side.

The light-tightness of the device is ensured by a cloth curtain 41 (FIG. 5) opaque to light and having an opening for passing the light beam, the four edges of this opening being assembled by a frame fitted to the case 24 and both external bindings of the curtain 41 which slide between two V-shaped slides 42 and 43.

The curtain 41 rolls up around two cylinders 44 and 45 located in a parallel direction from each side of the opening 34 of the camera chamber and fitted on two shafts 46 and 47 pivoting in rails 31 and 32 or into seats which are part of the chamber wall 38.

On shafts 46 and 47 are locked two helicoidal-grooved pulleys 48 and 49 on which there are wound two halves of a cable 50 linked together by a spring 51 and fixed to the slide 50 of the optical unit 24.

One of the shafts, the shaft 46 for example, is rotatively driven by the motor 35, which leads to a synchronous driving of the optical unit 24 and of the curtain 41.

During the movement of the optical unit 24, one of the extremities of the curtain 41 rolls up round one of the cylinders 44 or 45, while the other extremity locked with the other cylinder, uncoils.

The tension on the curtain 41 is obtained by the spring 51 by arranging the cable over the pulleys in order that the cable path be in reverse direction of that of the curtain, so that the spring will produce tension on both halves of the cable and consequently on the curtain.

Figure 6:
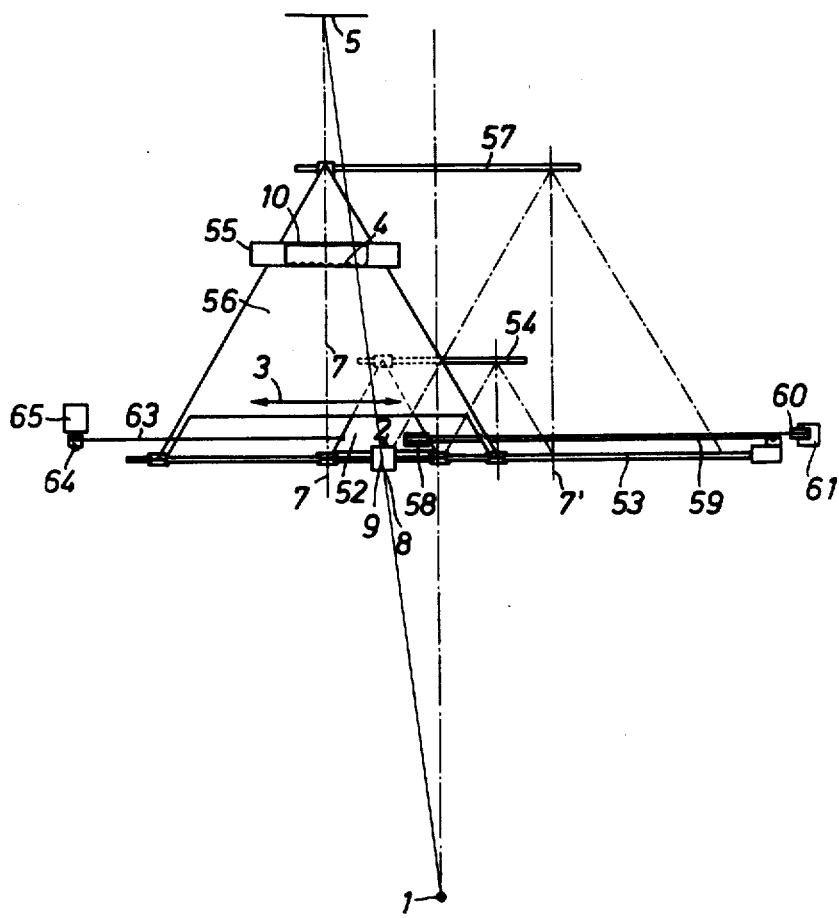
FIG. 6 is a schematic top view of a practical embodiment of a camera device for infinity and the transverse driving device of its movable elements.
Figure 7:
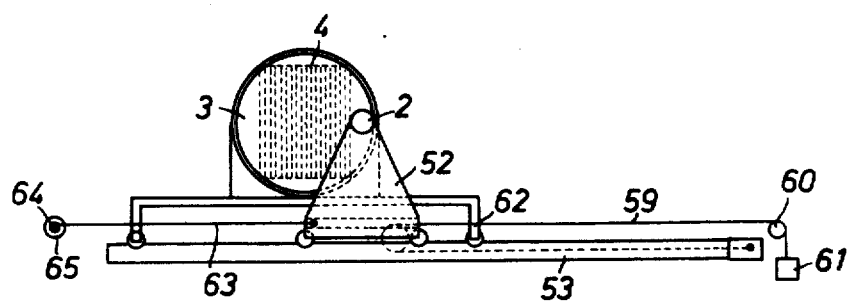
FIG. 7 is a schematic front view of the said device.

FIGS. 6 and 7 are schematic illustrations of an assembly arrangement permitting a simultaneous displacement of the objective 2 and of the optical surface 4 (FIG. 1) bearing the sensitive layer 10, this surface having to move twice as far as the objective.

For this purpose, the objective 2 is fitted on a first carriage 52 (FIGS. 6 and 7) rolling on a fore-rail 53 and on a back-rail 54, while the frame 55, bearing the optical surface 4 and the lens 3, is fitted on a second carriage 56 rolling on the fore-rail 53 and on a third rail 57 located behind the rail 53, the carriage plate 56 being designed for freely passing above the carriage 52.

The small carriage 52 bears a small grooved pulley 58 on which rolls up a cable 59 hose one extremity is affixed to the holder of the rail 53 or any other fixed point, the other extremity of the cable passing over a reversing heave 60 and inked with a weight 61 ensuring the constant tension of the cable. The cable is fixed on the carriage 56 at any convenient point 62.

On the other side, the small carriage 52 is connected by a cable 63 to a pulley 64 driven by a reversible motor 65.

The lengths of the cable halves and the diameter of the pulley 58 have been dimensioned so that for a given displacement 8 of the carriage 52 be obtained a two-fold displacement 9 of the carriage 56, as shown on the FIG. 1.

Figure 8:
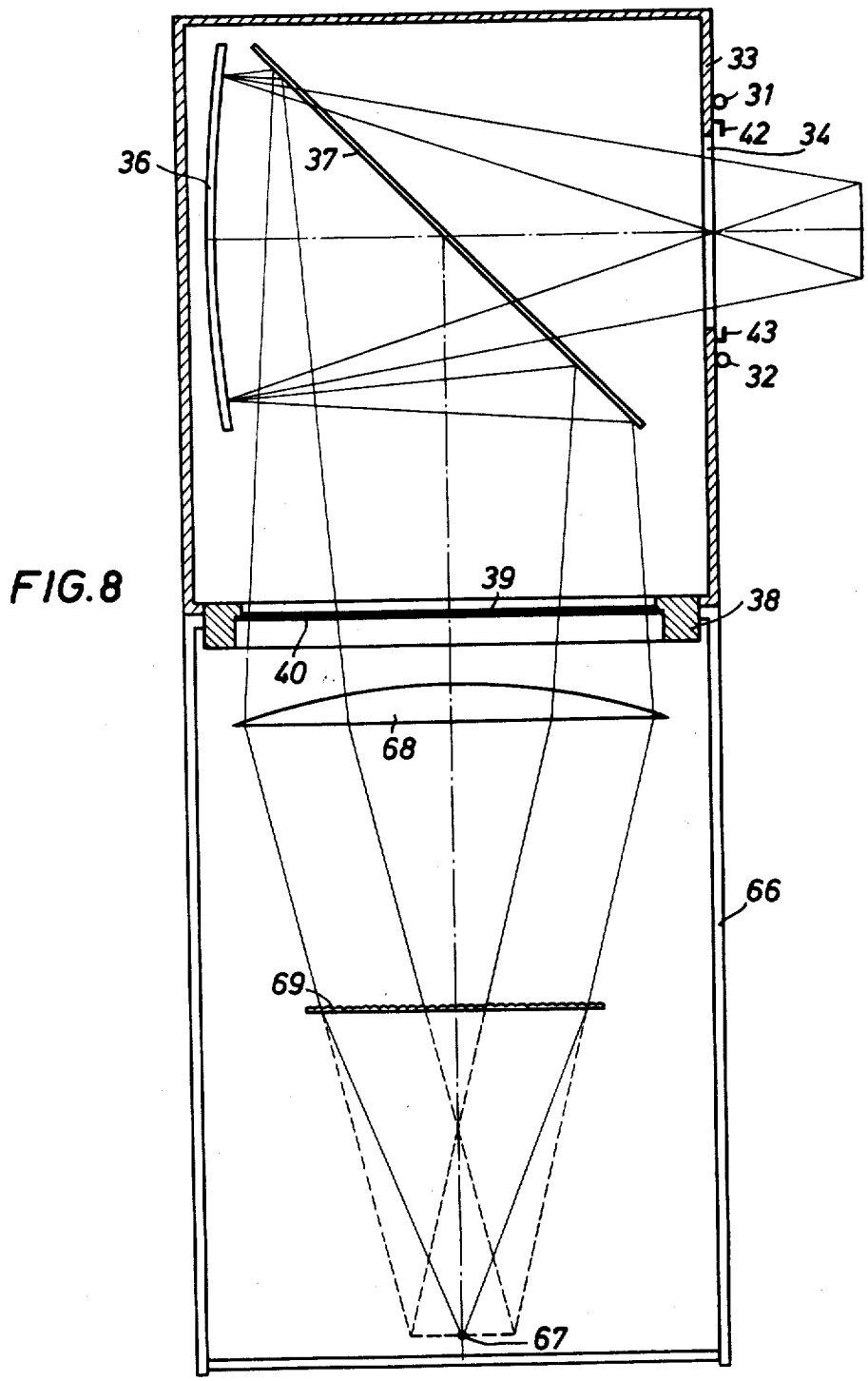
FIG. 8 is a schematic sectional view of the device arranged for carrying out the reproduction of views obtained with the same camera device.

The chamber 33 can be used as a reproducing device and FIG. 8 is a diagrammatic illustration of this application.

For this purpose, the chamber 33 is turned upside down and fitted on a frame 66 whose height allows the mounting inside thereof a pin-point light source 67 conveniently remote from the optical surface 39 with lenticular elements which has been coated with the sensitive layer 40 thereof having a developed image.

Into the frame 66 are fitted, on horizontal non illustrated holders, a field lens 68 and an optical surface 69 having lenticular elements operable to convert the pinpoint light source 67 into a linear light source.

The chamber 33 contains the mirror 36, the separator 37 and the frame 38 which contains the composite image surface. The section of the camera device containing the optical unit 24 has been removed.

The frame 66 must be high or raised high enough in order that the axis of the window 34 of the chamber be at such a level above the ground that it adequately allows the observation of the image by an observer being before the opening 34 which had passed the beams, during shooting, for the formation of the spatial image.

This window 34 is large enough in the height and width directions for allowing to the observer to perceive the whole field of the mirror 36 from any point whatsoever of the viewing range.

The cylindrical lenticular elements of the surface 39 should be placed in a parallel direction with the plane of the viewing range.

The projected image undergoes, during the path of the light rays, a double reversal which allows to the observer to see in a normal direction and it is thus not required to invert the composite image.

The location of the image with respect to the position of the concave mirror 36, makes advantageously possible for the light rays issuing from the light source 67 and which cross the points of the composite image on the surface image 40, to emerge from the diopter surface in an opposite direction, but in the same direction as the one taken by the said rays for forming the composite image and consequently to be reflected by the same points of the mirror surface, which allows the possibility of using mirrors having certain product faults, the effect of these faults being cancelled by a compensation due to the effect of inverted return of light rays, on condition that the same mirror or a similar mirror having analog faults be used when observing, the mirror having for the observer a position identical with that it had for the shooting optical unit.

It is thus possible to consider the application of very cheap mirrors made for example of aluminum plated plastics which can have faults which are repeated on every product.

Consequently, if the realization of a small-dimension device such as post-card size, is taken into consideration, the glass currently used can be replaced by plastics whose front face is aluminum-plated and back-face integral with a curved metal sheet such as the allow well known under the denomination "-duralumin" for avoiding distortions.

In order to obtain true-to-life feeling, it is recommended that the pitch $p$ of the embossing be dependent on the focal length $F$ of the mirror. In fact, the visual acuity of an observer is equal to 3/10,000 radian ;

Practically, the expression is $p/F = 3/10,000$. For a mirror having a focal length of 600 mm, the values are ; $p = 0.2$ mm.

$$\text{for } F = 300 \text{ mm}, p = 0.1 \text{ mm}.$$

$$\text{for } F = 150 \text{ mm}, p \ 32 \ 0.05 \text{ mm}$$

in this last case, which is convenient for the post-card size of 9 = 14 cm the advantage offered the compensation principle applied in the device arranged for reproducing the image has to be noted.

In fact, the smaller the focal length of the convex mirror, the higher the effect of aberrations, because the points of view of the observer deviate more and more from the optical axis of the mirror.

I claim:

1. A device for recording and reproducing stereoscopic images, said device comprising a parallelepipedic chamber with upstanding sides, one of said sides having a window formed therein, a frame mounted in such chamber carrying cylindrical lenticular element film coated with a sensitive layer capable of recording successively all composite images transmitted thereto, an optical unit including at least an objective which provides in each position of said optical unit an image of an object to infinity, mounting means for removably mounting said optical unit on said chamber in general alignment with said window, said mounting means including moving means for moving said optical unit generally across said window while remaining in alignment therewith, an optical system within said chamber for receiving rays defining an image of an object from said optical unit and directing such rays to said film, and said window also defining a viewing opening for viewing said film subsequent to the development thereof after said optical unit is removed.

2. The device according to claim 1, in which the optical system which directs the rays to the sensitive layer is made of an element chosen along a field lens and an objective, the whole of this system and the holder frame being made movable and moving in a parallel direction with the linear moving direction of the optical unit, but by moving twice as far as this unit.

3. The device according to claim 1, in which the optical system includes a concave mirror, said frame and said mirror are fixed, the optical unit includes two prisms each having an output axis, and said optical system also includes a semi-transparent separator plane mirror disposed between said concave mirror and the output face of the second prism, said semi-transparent separator plane mirror being inclined at a 45° angle to the output axis of said second prism, and said concave mirror being located perpendicular to the output axis of said second prism and the film sensitive layer being located in a parallel direction with said second prism output axis.

4. A device for recording and reproducing stereoscopic image comprising a parallelepipedic chamber with upright side walls, one of said side walls having a first rectangular window, an optical unit, means mounting said optical unit generally in alignment with said window for movement in a longitudinal direction, said optical unit having an objective located between two prisms, said chamber having mounted on a horizontal wall thereof adjacent to said one side wall a second rectangular window of larger dimensions than the first window, and a frame holding a cylindrical lenticular element film coated with a sensitive layer inserted in said second window, one of said prisms being capable of collecting the successive images of an object and reflecting them towards the objective for projection thereby on the second prism, said second prism having a beam axis and being positioned for reflecting them to a concave mirror mounted in the chamber along the wall opposite to the one wall carrying said optical unit, and a semi-transparent separator plane mirror crossing and inclined at a 45° angle with respect to the beam axis for directing the rays to the sensitive layer.

5. The device according to claim 1 in which the mounting means includes rails fixed on the one wall slidably mounting said optical unit, and an electrical motor coupled to said optical unit for sliding the same.

6. The device according to claim 4 wherein said mounting means includes a dark-slide shutter curtain rolling up around two cylinders mounted on said one side wall and spaced from both sides of the optical unit, said shutter curtain having a window corresponding with an output opening of said optical unit and sealed relative thereto thereby ensuring the light-tightness of the chamber from both sides of said optical unit during the displacement of the optical unit.

7. The device of claim 6 in which the linear movement of the optical unit and of the dark-slide shutter curtain is obtained through a motor via a cable and pulleys.

8. The device of claim 1 wherein said frame is mounted in an opening of a second wall of said chamber, and said device, when utilized in viewing recorded and developed composite images, includes a case having an end means for mounting said chamber inverted 180° from its normal position and seated on said second wall, said case containing a light source, an optical surface with cylindrical lenticular elements receiving rays from said light source, and a field lens of sufficiently large dimensions for covering the opening of the chamber second wall equipped with the frame holding the cylindrical lenticular element film whose sensitive surface has been acted upon, and the lenticular elements of said optical surface being oriented perpendicular with respect to the lenticular elements of the film, the images on said film being observable through said window in said one side of the chamber on the concave mirror of this latter and through the semi-transparent separator plane mirror with said concave mirror and said semi-transparent separator plane mirror functioning in a manner opposite to that thereof during shooting of a picture.

* * * * *